United States Patent
Nojiri et al.

(10) Patent No.: US 7,995,302 B2
(45) Date of Patent: Aug. 9, 2011

(54) DISK DRIVE DEVICE AND CONTROL METHOD OF UNLOADING CORRESPONDING TO FALL DETECTION IN DISK DRIVE DEVICE

(75) Inventors: Sayaka Nojiri, Kanagawa (JP); Shinji Matsushita, Kanagawa (JP); Naoya Tsurusaki, Kanagawa (JP); Hirofumi Saitoh, Kanagawa (JP)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 6 days.

(21) Appl. No.: 12/386,919

(22) Filed: Apr. 23, 2009

(65) Prior Publication Data

US 2009/0268334 A1    Oct. 29, 2009

(30) Foreign Application Priority Data

Apr. 24, 2008  (JP) ................................ 2008-114682

(51) Int. Cl.
*G11B 15/18*   (2006.01)
*G11B 27/36*   (2006.01)
*G11B 21/02*   (2006.01)

(52) U.S. Cl. ................................ 360/71; 360/31; 360/75

(58) Field of Classification Search ................ None
See application file for complete search history.

(56) References Cited

U.S. PATENT DOCUMENTS

| | | | |
|---|---|---|---|
| 6,236,527 B1 | 5/2001 | Uchiike et al. | |
| 6,995,939 B2 * | 2/2006 | Ito et al. | 360/75 |
| 7,199,969 B2 | 4/2007 | Yoshida | |
| 7,369,345 B1 * | 5/2008 | Li et al. | 360/75 |
| 7,420,761 B2 * | 9/2008 | Aoki et al. | 360/75 |
| 7,428,119 B2 | 9/2008 | Kuroki et al. | |
| 7,525,751 B2 * | 4/2009 | Han et al. | 360/75 |
| 7,551,389 B2 * | 6/2009 | Tsuda et al. | 360/75 |

FOREIGN PATENT DOCUMENTS

| | | |
|---|---|---|
| JP | 10-162529 | 6/1998 |
| JP | 2001-014783 | 1/2001 |

* cited by examiner

*Primary Examiner* — K. Wong

(57) ABSTRACT

Embodiments of the present invention improve the safety against a fall of a disk drive device. In one embodiment, when an HDD has recognized detection result data of a fall sensor to indicate a fall, the HDD unloads a head slider from above a disk to a stand-by position. The HDD checks whether or not the detection result data of the fall sensor indicates a fall on the occasion of a seek start. If the data indicates a fall, the controller unloads an actuator. The HDD issues a seek fake error on the occasion of a seek completion. On the occasion of a re-seek start in the error recovery process, the HDD conducts a fall check referring to the detection result data.

18 Claims, 5 Drawing Sheets

DISK DRIVE DEVICE AND CONTROL METHOD OF UNLOADING CORRESPONDING TO FALL DETECTION IN DISK DRIVE DEVICE

CROSS-REFERENCE TO RELATED APPLICATION

The instant nonprovisional patent application claims priority to Japanese Patent Application No. 2008-114682 filed Apr. 24, 2008, and which is incorporated by reference in its entirety herein for all purposes.

BACKGROUND OF THE INVENTION

Disk drive devices using various kinds of disks, such as optical disks, magneto-optical disks, and flexible magnetic disks, have been known in the art. In particular, hard disk drives (HDDs) have been widely used as storage devices of computers and have been one of indispensable storage devices for current computer systems. Moreover, the HDDs have found widespread application to moving image recording/reproducing apparatuses, car navigation systems, cellular phones, and the like, in addition to the computers, due to their outstanding characteristics.

In portable electronic equipment with a built-in HDD, protection of the HDD from an impact when the electronic equipment has accidentally fallen onto the ground, for example, is an important object. An HDD spins a magnetic disk and moves a head slider flying above the magnetic disk to a target data sector to access the magnetic disk. Therefore, if an impact is applied to an HDD in operation by a fall, a head slider, a suspension supporting the head slider, or a magnetic disk (data on the magnetic disk) may be damaged by the collision between the head slider and the magnetic disk.

To prevent such damage, a protection mechanism has been known that detects falling of an HDD or HDD built-in electronic equipment and withdraws a head slider to a safe position (stand-by position) where the head slider will not contact the magnetic disk. Typically, the HDD comprises a ramp where an actuator is to be withdrawn and moves the actuator onto the ramp when it has detected a fall. An HDD with such a protection mechanism mounted is disclosed in Japanese Patent Publication No. 2007-115309 ("Patent Document 1"), for example.

A head slider may collide with a magnetic disk because of an external impact as well as a fall. A typical HDD having a fall sensor comprises an impact sensor, too; when the impact sensor detects an impact, the HDD moves the actuator onto the ramp (refer to Japanese Patent Publication No. 2001-14783 "Patent Document 2", for example). The timing of impact application from the external is irregular. On the other hand, an HDD may have different levels of impact resistance depending on the HDD's operation.

To this end, Patent Document 2 proposes to change the impact threshold to unload the actuator depending on the HDD's operation. For example, an HDD disclosed in Patent Document 2 adopts different thresholds between a seek operation and a following operation; if the HDD detects any impact exceeding the threshold corresponding to the operation, it stops the operation and unloads the actuator (head slider).

In a typical fall of an HDD, the HDD collides with a floor after a free fall. The HDD is required to unload the actuator after detecting the fall until the collision. Differing from a direct impact applied to the HDD, there exists a certain amount of fall duration from the beginning of the fall to the application of an impact to the HDD. Therefore, it is sufficient if the controller unloads the actuator from the beginning of the fall until the collision and the controller does not need to unload the actuator immediately after the beginning of the fall.

When the controller in an HDD interrupts host command processing, it needs to save many parameters to resume the process according to the occasions of the interrupt, which is a heavy load to the controller. Unloading operation in response to a fall with arbitrary timing during command processing may cause an error in the processing in the controller and reduce the safety in the controller's processing.

Accordingly, it may be desirable to conduct an unloading operation in response to a fall detection only on predetermined occasions in command processing. In an HDD which conducts an unloading operation when it has recognized a fall, the timing of the unloading operation can be limited to the intended timing in a process by restricting the timing for the controller to check for a fall.

The controller can proceed with command processing within the time lag between the beginning of a fall and the collision. Therefore, even if the occasions available for unloading in the process is restricted, setting appropriate occasions allows the controller to proceed with the process into a fall check before the HDD receives an impact by a collision to the floor, so that the controller can safely withdraw the head slider.

However, the duration from the beginning of a fall to the HDD's receipt of impact depends on the height of the fall. As more mobile products employ HDDs, securer protection operation against falls from lower height has been requested. To improve the HDD's safety against a fall and to achieve an actuator's unloading before a collision caused by a fall from a lower position, it is necessary to reduce the duration from the beginning of a fall to the controller's check for the fall.

In an HDD which unloads an actuator after checking for a fall, increase in frequency of the controller's check for a fall detection results in reduction of time intervals between the fall checks. This reduces a successive processing time without a fall check after the beginning of a fall to accomplish a more rapid unloading operation after the beginning of a fall.

However, newly setting the timing of fall check requires much time and large resources, such as examining effects on other processes and examining unloading operations with the new timing. To design and develop HDDs under extremely rapid technological development, rapid design and high flexibility are required. Accordingly, a technique is desired that increases frequency of fall check and unloads an actuator with more safety against a fall from a lower position without extensive modification of existing designs.

BRIEF SUMMARY OF THE INVENTION

Embodiments of the present invention improve the safety against a fall of a disk drive device. In one embodiment, when an HDD has recognized detection result data of a fall sensor to indicate a fall, the HDD unloads a head slider from above a disk to a stand-by position. The HDD checks whether or not the detection result data of the fall sensor indicates a fall on the occasion of a seek start. If the data indicates a fall, the controller unloads an actuator. The HDD issues a seek fake error on the occasion of a seek completion. On the occasion of a re-seek start in the error recovery process, the HDD conducts a fall check referring to the detection result data.

DETAILED DESCRIPTION OF THE INVENTION

Figure 1:
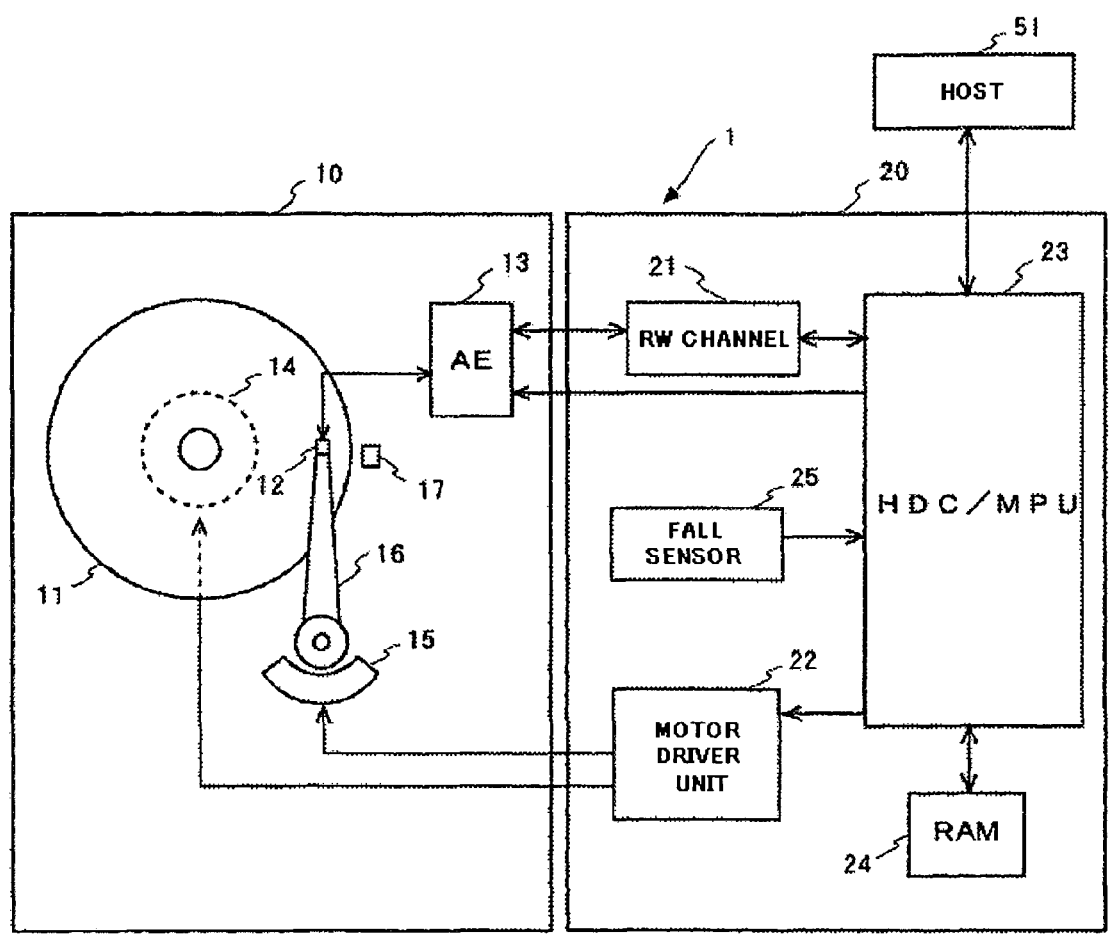
FIG. 1 is a block diagram schematically depicting the configuration of a hard disk drive according to one embodiment.

Embodiments of the present invention relate to a disk drive device and a control method of unloading corresponding to a fall detection in the disk drive device, and in particular, relate to control of unloading corresponding to a fall detection during processing commands from a host.

A disk drive device according an aspect of embodiments of the present invention comprises a disk, a head for accessing the disk, a moving mechanism for supporting the head and moving the head along the radial direction of the disk, a sensor for detecting a fall, and a controller for controlling the moving mechanism according to outputs of the sensor. The controller checks whether or not detection result data of the fall sensor indicate a fall on a predetermined occasion in command processing, and if a fail is recognized, unloads the head by controlling the moving mechanism; issues a fake error on an occasion in the command processing; starts an error recovery process for the fake error; and conducts the check on the predetermined occasion in the error recovery process, and if a fall is recognized, unloads the head by controlling the moving mechanism. This improves the safety of the disk drive device against a fall by easier design changes.

The predetermined occasion may be the occasion of a seek start of the head. This achieves a fall check at a separation point of the process in the beginning of a command process. Moreover, the error recovery process may include a re-seek step, and the controller check whether or not detection result data of the fall sensor indicate a fall on the occasion of the re-seek start, and if a fall is recognized, unloads the head by controlling the moving mechanism. This achieves a fall check through the same method in the normal process. In addition, the controller may perform the error recovery process according to an error recovery table, and the step of the re-seek be the step to be performed first in the steps registered in the error recovery table. This allows a fall check to be performed more quickly.

The controller may issue fake errors of the same error on every occasion. This achieves an efficient processing for a fall check. The controller may also issue the fake error on the occasion of a seek completion of the head. This is because that the occasion of the seek completion is between the occasions of the seek start and is a separation point of the process.

Furthermore, the controller may issue the fake error on the occasion of a seek completion of the head. This achieves efficient loading operation after unloading. If a fall has been detected, the controller may issue the fake error on the occasion in the command processing. This achieves an efficient processing. The detection result data may be data indicating that the sensor for detecting a fall has detected a fall. This reduces the load to the controller.

Another aspect of embodiments of the present invention is a control method of unloading corresponding to a fall detection in a disk drive device. This method checks whether or not detection result data of a fall sensor indicate a fall on a predetermined occasion in command processing, and if a fall is recognized, unloads a head; issues a fake error on an occasion in the command processing; starts an error recovery process for the fake error; and conducts the checking on the predetermined occasion in the error recovery process, and if a fall is recognized, unloads the head. This improves safety of the disk drive device against a fall by easier design changes.

Embodiments of the present invention can increase the safety against a fall in a disk drive device which unloads an actuator after detecting a fall.

Hereinafter, particular embodiments of the present invention will be described. For clarity of explanation, the following description and the accompanying drawings contain omissions and simplifications as appropriate. Throughout the drawings, like components are denoted by like reference numerals, and their repetitive description is omitted if not necessary. In the embodiments, a hard disk drive (HDD) will be described as an example of a disk drive device. An HDD of one embodiment comprises a sensor for detecting the HDD's fall. When the HDD has recognized that the sensor's detection result data indicate a fall, the HDD unloads an actuator (a head slider) from above a magnetic disk to a stand-by position, which prevents the head slider or the data on the magnetic disk from being damaged by an impact after the fall.

A controller of an HDD performs and controls the unloading operation corresponding to a fall. The controller checks whether or not the fall sensor's detection result data indicate a fall on predetermined occasions in a command process such as a read process or a write process. If the detection result data indicate a fall, the controller unloads the actuator.

The controller of one embodiment issues a fake error on different occasions from the above-described predetermined occasions in a command process. The fake error is a pseudo error notice issued regardless of the fact that a real error has not occurred. The fake error has the same format as a real error notice and the controller performs an error recovery process to the fake error in the same way as the one from a usual error notice.

The error recovery process in response to the fake error includes the process steps corresponding to the above-described predetermined occasions. In the error recovery process, the controller checks for a fall through the same method in the normal process, namely by referring to detection result data on the predetermined occasions.

This increases the number of times (frequency) of the controller's checking for a fall in a command process to achieve quicker unloading. Since the fall check in the error recovery process is performed through the same method (on the same occasions) as the fall check in the normal process, efficient design changes and safer design changes with a little influence to the existing design can be achieved.

Before describing details of the fall check using a fake error according the embodiments and the corresponding unloading operation, the entire configuration of an HDD of one embodiment will be outlined. As illustrated in the block diagram of FIG. 1, the HDD 1 comprises a circuit board 20 fixed outside of an enclosure 10. On the circuit board 20, circuits such as a read and write channel (RW channel) 21, a motor driver unit 22, an integrated circuit (HDC/MPU) 23 of a hard disk controller (HDC) and an MPU, a RAM 24 of a semiconductor memory are arranged. The HDD 1 further comprises a fall sensor 25 on the circuit board 20. The fall sensor 25 may be mounted on any place of the HDD 1.

In the enclosure 10, a spindle motor (SPM) 14 spins a magnetic disk 11 at a specific angular rate. The magnetic disk 11 is a disk for storing data. Head sliders 12, an example of heads, each comprise a slider for flying over the magnetic disk 11 and a head element portion which is secured to the slider and converts magnetic signals to/from electric signals (reads and writes data) to access (read or write) the magnetic disk 11. The head sliders 12 are secured at the tip of an actuator 16. The actuator 16, a moving mechanism of the head sliders 12, is connected to a voice coil motor (VCM) 15 and rotates on the rotational shaft to move the head sliders 12 above the spinning magnetic disk 11 along the radial direction.

The HDD 1 employs the ramp loading and unloading scheme; when it stops the spin of the magnetic disk 11 to switch into a non-operation state, it withdraws the actuator 16 (head sliders 12) from above the recording surface of the magnetic disk. The withdrawn actuator 16 rides onto a ramp located near the magnetic disk 11 to park there. More particularly, a tab (not shown) formed at the tip of the actuator rides onto the surface of the ramp 17 and parks there. In this event, the head sliders 12 are outside of the magnetic disk 11.

The operation that the head slider 12 (actuator 16) is moved from above the magnetic disk 11 to the stand-by position on the ramp 17 is called unloading and the operation that the head slider 12 is moved from the ramp 17 to above the magnetic disk 11 is called loading. In the present specification, notwithstanding the position of the stand-by position of the actuator 16 (head slider 12), the operation to move the actuator 16 to the stand-by position is called unloading and the operation to move it from the stand-by position to above the data area of the magnetic disk is called loading.

The motor driver unit 22 drives the SPM 14 and the VCM 15 according to the control data from the HDC/MPU 23. An arm electronics (AE) 13 selects a head slider 12 to access (read or write) the magnetic disk 11 from a plurality of head sliders 12 according to the control data from the HDC/MPU 23 and amplifies read/write signals. The RW channel 21, in read operations, extracts servo data and user data from the read signals obtained from the AE 13 and decodes them. The decoded data are supplied to the HDC/MPU 23. The RW channel 21, in write operations, code-modulates the write data supplied from the HDC/MPU 23, converts the code-modulated data into write signals, and then supplies them to the AE 13.

In the HDC/MPU 23, the HDC is a logic circuit and the MPU works according to firmware loaded into the RAM 24. Upon a start-up of the HDD 1, the data required for control and data processing are loaded into the RAM 24 from the magnetic disk 11 or a ROM (not shown). The HDC/MPU 23 is an example of a controller and performs entire control of the HDD 1 in addition to necessary processes associated with data processing, such as head positioning control, interface control, and defect management.

The HDC/MPU 23 controls loading and unloading of the actuator 16 according to the outputs of the fall sensor 25. If the HDC/MPU 23 has recognized the HDD's fall from the outputs of the fall sensor 25, it unloads the actuator 16 (head slider 12). When the HDD 1 has returned to a still state after the fall, the HDC/MPU 23 loads the actuator 16 again.

Hereinafter, the unloading operation corresponding to a fall according to one embodiment in a read process or a write process (read/write process) of processes corresponding to commands from a host will be described. The HDC/MPU 23 of the present embodiment checks for a fall on the predetermined occasions in the read/write process. When the HDC/MPU 23 recognizes a fall, it unloads the actuator 16.

Figure 2:
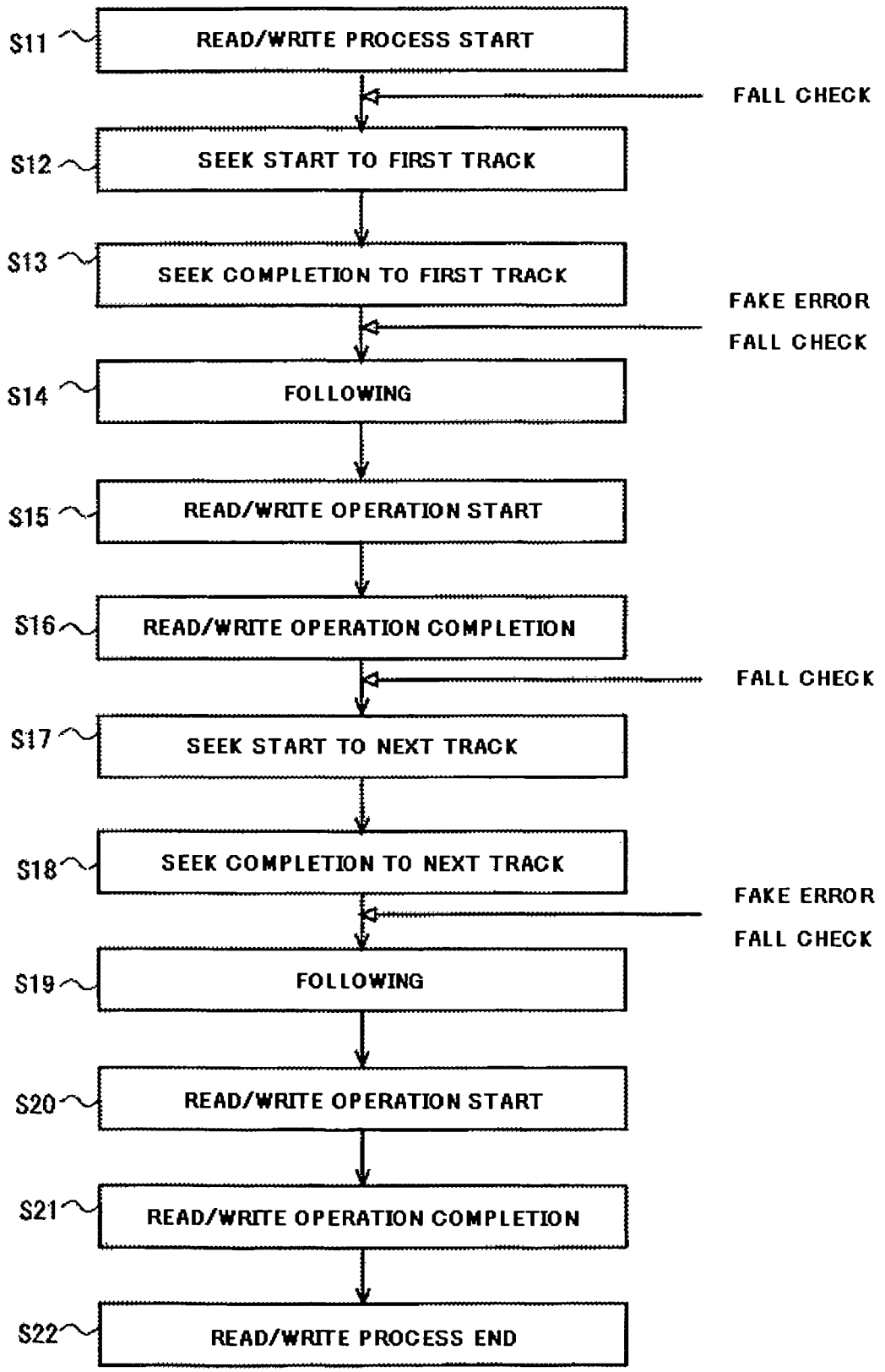
FIG. 2 is a flowchart of the process of a fall check on the predetermined occasions and a fall check using a fake error in a read/write process in one embodiment.

One occasion of the fall check is the occasion of a seek start. Referring to the flowchart of FIG. 2, a read/write process in which the HDC/MPU 23 conducts a fall check on the occasion of seek start will be described. FIG. 2 shows a process flow where the data in the read/write process are provided across two data tracks.

When the HDC/MPU 23 has obtained a read/write command from a host 51, it starts the read/write processing corresponding to the command (S11). The HDC/MPU 23 controls the VCM 15 through the motor driver unit 22 to start a seek operation of the head slider 12 to the data track of the logical block address specified by the command (S12). The HDC/MPU 23 checks for a fall based on the output of the fall sensor 25 before the actual start of moving the head slider 12. The fall check will be described later. If the HDD 1 is falling, the HDC/MPU 23 unloads the actuator 16 (head slider 12).

If the HDD 1 is not falling, the HDC/MPU 23 starts moving the head slider 12 to the first target data track (S12), and upon the completion of the moving (S13), it performs a following operation to the target data track (S14). Moreover, when the head slider 12 reaches the target sector, the HDC/MPU 23 starts reading/writing data from/to the target data sector with the head slider 12 (S15). If the reading/writing data from/to the data track is completed (S16), the HDC/MPU 23 performs a seek operation to the next target data track (S17).

On the occasion of this seek start, the HDC/MPU 23 performs a fall check. If the HDD 1 is falling, the HDC/MPU 23 unloads the actuator 16 (head slider 12). If the HDD 1 is not falling, the HDC/MPU 23 starts moving the head slider 12 to the next target data track (S17), and upon the completion of the moving (S18), it performs a following operation to the target data track (S19). Moreover, when the head slider 12 reaches the target sector, the HDC/MPU 23 reads/writes data from/to the target data sector (S20, S21) to end the read/write process (S22).

The start of the seek operation is a kind of separation point in the read/write process. Accordingly, the unloading on this occasion can achieve safer unloading and more efficient resume of the interrupted processing compared with other occasions. Further, it more securely prevents the unloading from causing an error in the controller's processing. When the head slider 12 is positioned above the magnetic disk, the first primary operation in the read/write process is a seek, so that a fall check can be conducted immediately before the start of the read/write process.

The HDC/MPU 23 frequently conducts fall checks if it is not processing a command. Accordingly, immediately after the read/write process has ended, the HDC/MPU 23 conducts a fall check. In this way, the fall check on the occasion of seek start can shorten the time until the next fall check. If a seek is performed on the way of read/write processing as in the above example, the HDC/MPU 23 conducts a fall check, too. Accordingly, even if a plurality of data tracks are to be accessed (read/written), the interval between the fall checks does not increase but can be settled within a specific range.

As shown in FIG. 2, the HDC/MPU 23 of one embodiment conducts a fall check using a fake error on other occasions in addition to the occasion of a seek start, which is based on the predetermined occasions of the fall check. The HDC/MPU 23 may generate a fake error on the occasion of a seek completion (if specific conditions are satisfied), and conducts a fall check in the corresponding error recovery processing.

The error recovery process includes a step of seek operation, and the HDC/MPU 23 checks for a fall on the occasion of seek start. The fall check in the error recovery process on the same occasion (by the same method) as the predetermined occasion achieves safer design changes with less influence on the existing design.

Before explaining the fall check using a fake error in detail, a fall check and an unloading operation on the occasion of seek start in normal processing will be explained with reference to the block diagram of FIG. 3. The fall sensor 25 used in the HDD 1 of one embodiment can be selected from fall sensors with some different configurations. Among them, a fall sensor having a fall determination circuit may be the fall sensor 25 used in the HDD 1.

In general, a fall sensor comprises acceleration sensors for three axes orthogonal to each other. In one example, the fall sensor 25 comprises a determination circuit and determines whether or not a fall is occurring from the outputs of the acceleration sensor. For example, if the absolute values of the accelerations in the three directions are present in a reference range and the state is kept for a specific period, the determination circuit determines that a fall is currently occurring. Fall determination by the fall sensor 25 can reduce the load to the HDC/MPU 23.

Figure 3:
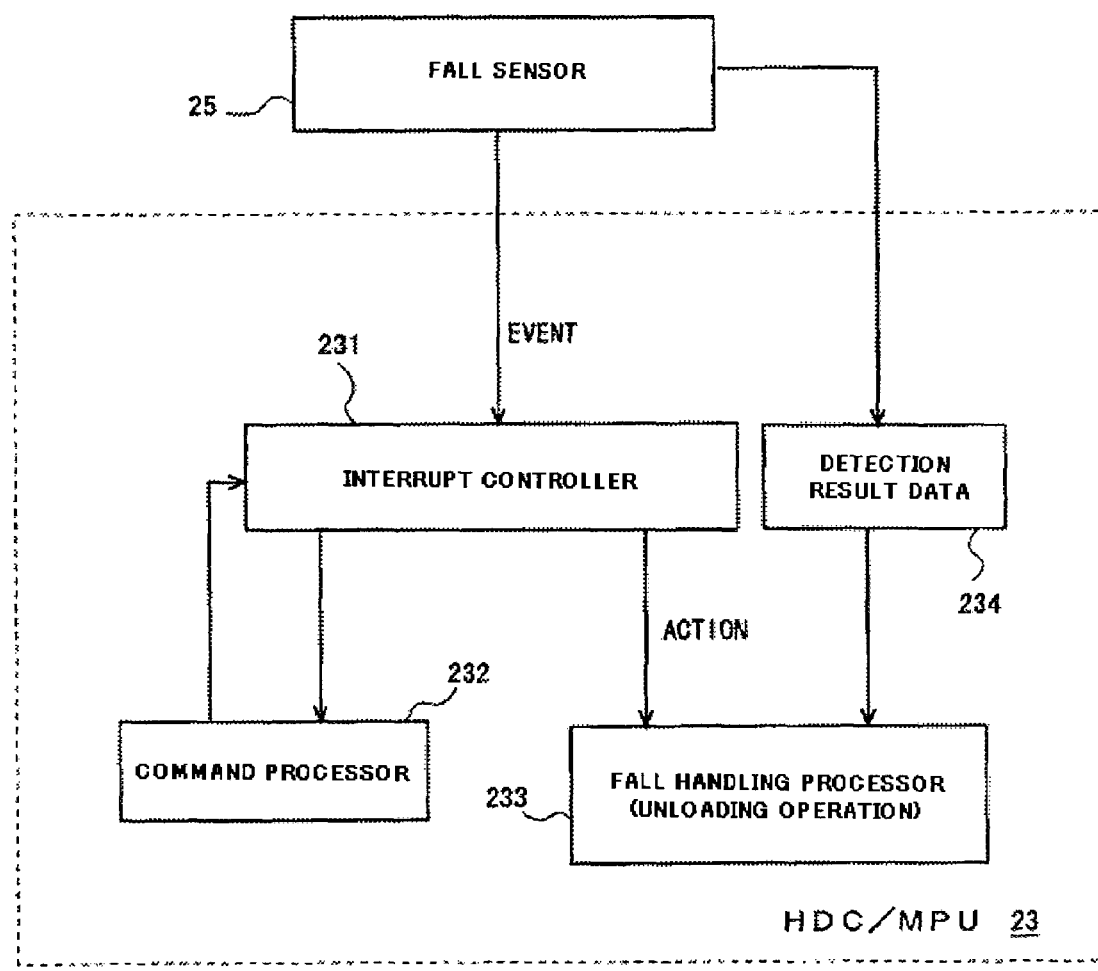
FIG. 3 schematically shows components associated with a fall check and an unloading operation in normal processing in one embodiment.

The block diagram of FIG. 3 schematically shows the components associated with a fall check and an unloading operation in normal processing. The components shown within the HDC/MPU 23 correspond to the functions executed by the HDC/MPU 23. The hardware and MPU to operate according to firmware in the HDC/MPU 23 function as a command processor 232, an interrupt controller 231, and a fall handling processor 233. Either one or the both of the HDC and the MPU work to achieve these functions. The HDC/MPU 23 includes a detection result register 234 in which the data detected by the fall sensor 25 are stored.

In the block diagram of FIG. 3, when the command processor 232 has received a read/write command from a host 51, it controls and processes operations corresponding to the command. Specifically, it processes operations such as a seek, a following, and a data read/write. When the fall sensor 25 detects a fall (determines that a fall is occurring), it notifies the HDC/MPU 23 of the EVENT to interrupt the processing and stores a fall detection flag of detection result data to the detection result register 234.

The interrupt controller 231 controls an interrupt from the fall sensor 25. Even if the interrupt controller 231 has received an EVENT notice from the fall sensor 25 during the processing of the command processor 232, the interrupt controller 231 does not respond immediately but holds the EVENT notice until the command processor 232 starts a seek. Immediately before the seek start of the command processor 232, the interrupt controller 231 issues an ACTION notice to start up the fall-handling processor 233 and commands it to conduct operations corresponding to the fall detection by the fall sensor 25.

The processing of the command processor 232 is interrupted on the occasion just before the head slider 12 is moved. The fall handling processor 233 checks whether or not the HDD 1 is falling (a fall check), referring to the fall detection flag in the detection result register 234. Since the fall detection flag indicates the current fall of the HDD 1, the fall handling processor 233 unloads the actuator 16.

Figure 4:
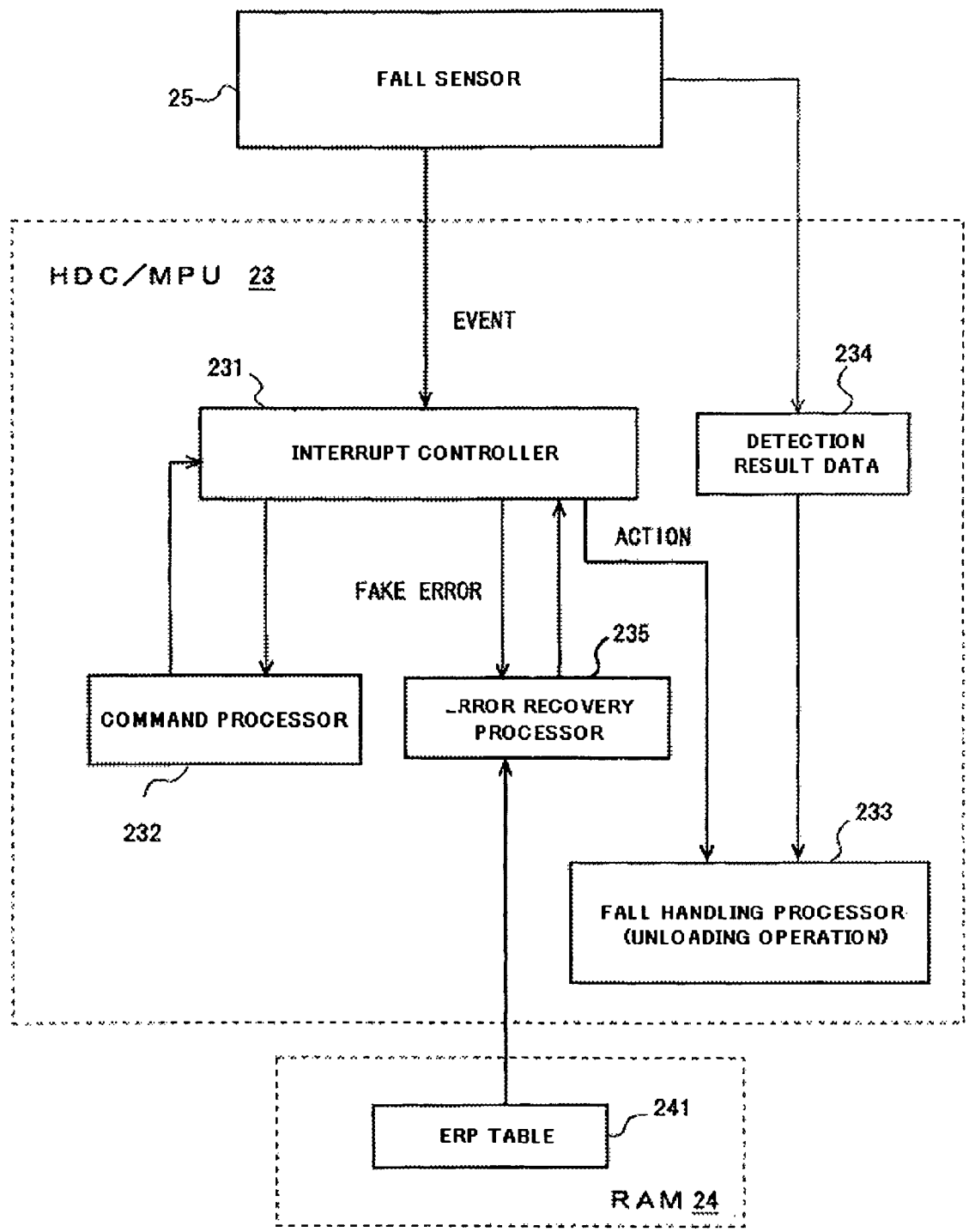
FIG. 4 schematically shows components associated with a fall check and an unloading operation using a fake error in one embodiment.

Next, the fall check and the unloading operation using a fake error will be described with reference to the block diagram of FIG. 4. In the block diagram of FIG. 4, an error recovery processor 235 is a function executed by the HDC/MPU 23. As described with reference to FIG. 2, the HDC/MPU 23 issues a fake error notice on the occasion of a seek completion in a read/write process and conducts a fall check in the process for the fake error.

The operations of the command processor 232 corresponding to a read/write command from the host 51 are the same as explained with reference to FIG. 3. When the fall sensor 25 detects a fall after the command processor 232 starts a seek, it interrupts the HDC/MPU 23 by an EVENT notice and sets a fall detection flag to the detection result register 234. The interrupt controller 231 holds the EVENT notice from the fall sensor 25.

When the command processor 232 completes the seek operation, the interrupt controller 231 issues a fake error. The command processor 232 interrupts the processing and the error recovery processor 235 starts an error recovery process corresponding to the issued fake error. The error recovery process includes a seek step. Similar to the normal processing, the interrupt controller 231 issues an ACTION notice to start up the fall handling processor 233 in response to the interrupt (EVENT notice) from the fall sensor 25 on the occasion of a seek start by the error recovery processor 235.

The processing of the error recovery processor 235 is interrupted on this occasion. The fall handling processor 233 checks whether or not the HDD 1 is falling (a fall check), referring to the fall detection flag in the detection result register 234. Since the fall detection flag indicates the current fall of the HDD 1, the fall handling processor 233 unloads the actuator 16.

An error used as the fake error is selected from the types of real errors. Errors in the normal processing are a seek error, a read error, and a write error, for example. Among them, the seek error may be used as the fake error. As described above, the HDC/MPU 23 checks for a fall on the occasion of a seek start. Therefore, the error recovery processor 235 may perform a seek operation on an earlier occasion in the error recovery process, or at the first step, if possible.

The error recovery processor 235 performs an error recovery process from a seek error referring to a seek ERP table 241. The ERP table 241 consists of a plurality of error recovery steps and the error recovery process executes the steps sequentially from a step with higher priority. The seek ERP table 241 includes a re-seek step and the re-seek is conducted at the error recovery step with the highest priority for effective error recovery. Thus, the HDC/MPU 23 conducts a fall check in the beginning of the error recovery process to shorten the time until the unloading.

Figure 5:
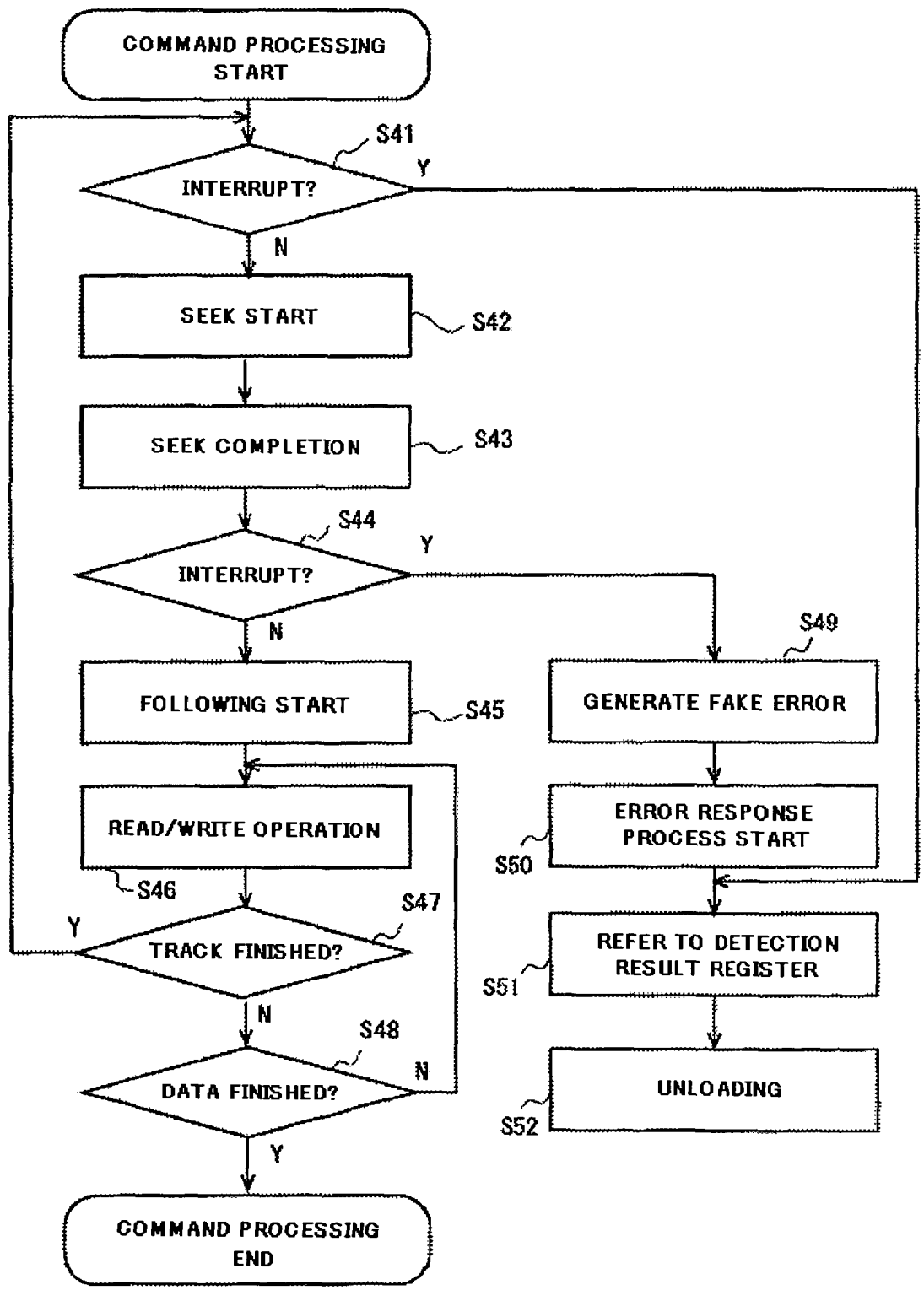
FIG. 5 is a flowchart of the process of a fall check and an unloading operation in a read/write process in one embodiment.

Subsequently, a more specific example of the fall check and unloading operations in a read/write process will be described with reference to the flowchart of FIG. 5. The flowchart of FIG. 5 includes both of a fall check on the predetermined occasion in the normal processing (on the occasion of seek start) and a fall check using a fake error. An example using a seek error as the fake error will be described.

The command processor 232 starts the processing corresponding to a read/write command. If the interrupt controller 231 has been received an interrupt from the fall sensor 25 (Y in S41), it notifies the fall handling processor 233 of the interrupt on the occasion of a seek start (immediately before the actual head movement).

The fall handling processor 233 checks whether or not the HDD 1 is falling (a fall check), referring to the fall detection flag in the detection result register 234 (S51). Since the fall detection flag indicates the current falling of the HDD 1, the fall handling processor 233 unloads the actuator 16 (S52).

If the interrupt controller 231 has not received the interrupt from the fall sensor 25 on the occasion of a seek start (N in S41), the command processor 232 starts a seek operation to a target data track (S42). When the seek operation is completed (S43), the subsequent operations branch depending on the presence or absence of interrupt from the fall sensor 25 after the seek start.

If an interrupt from the fall sensor 25 is present (Y in S44), the interrupt controller 231 issues a fake seek error (S49). The fall handling processor 233 starts the error recovery processing (S50) in response to the issued pseudo seek error. Specifically, the error recovery process is a seek ERP, the fall handling processor 233 starts the error recovery step with the highest priority referring to the seek ERP table 241. The error recovery step with the highest priority is a re-seek (a seek under the same condition as a usual seek).

Accordingly, similar to the normal processing, the interrupt controller 231 instructs the fall handling processor 233 to perform the processing corresponding to a fall detection by the fall sensor 25 in response to the interrupt from the fall sensor 25 on the occasion of a re-seek start. The processing of the error recovery processor 235 is interrupted at this time.

The fall handling processor 233 checks whether or not the HDD 1 is falling (a fall check) referring to a fall detection flag in the detection result register 234 (S51). Since the fall detection flag indicates the current falling of the HDD 1, the fall handling processor 233 unloads the actuator 16 (S52).

If an interrupt from the fall sensor 25 is not present (N in S44), the command processor 232 starts a following operation to the target data track (S45) and performs a read/write operation from/to the target data sector (S46). The command processor 232 continues the read/write operation from/to the target sectors until the end of a single rotation of a data track (S47 and N in S48). If the data sectors to be accessed are finished (Y in S48) before the end of the single rotation of the data track (N in S47), the command processor 232 completes the read/write process.

If the data track has rotated once before the data to be read/written are finished (Y in S47), the command processor 232 starts a seek operation to the next data track (S42). The interrupt controller 231 performs the operations corresponding to the interrupt from the fall sensor 25 (S41) on the occasion of the seek start. The operations in the steps following to the step S42 are the same as the above description.

As described above, issuance of a fake error can increase the opportunity of the fall check without changing the predetermined occasions of the fall check in the normal processing, which achieves swifter response to a fall that occurred during read/write processing. In addition, the flexibility in designing and developing HDDs increases, which in turn suppresses the risk of system errors accompanying the design change.

The above example issues a fake error on the occasion of a seek completion in the normal processing. However, instead of the seek completion or in addition to this, the fake error may be issued on a different occasion. For example, the fake error may be issued immediately before, immediately after, or during a data read/write operation. Similar to selecting the seek start as the predetermined fall check occasion, the seek completion is appropriate in light of separation point in processing.

If fake errors are issued on a plurality of occasions in a read/write process, the same type of errors may be issued on any occasion. This is because that the object of the fake errors is the same operation, fall check, so that an appropriate type of error may be selected.

The fake error to be issued may be a seek error. This is because that the seek error recovery process includes the re-seek step as the highest priority step as described above, and further, resuming the interrupted error recovery process after the end of the fall enables the head slider 12 withdrawn to the ramp to return easily and immediately to the target data track before the unloading operation.

Accordingly, if fake errors are issued on different occasions in a read/write process, a fake error in a seek operation may be issued on any occasion. The fake errors associated with the seek operation may be an error corresponding to the seek operation like a fake error at a seek completion.

The HDD 1 can employ a fall sensor with a configuration different from the above configuration as the fall sensor 25. For example, a fall sensor may be used that senses zero gravity with a mechanical switch which opens in the state of zero gravity.

Alternatively, the fall sensor 25 does not need to have a fall determination circuit but may transfer gravities calculated from the outputs of the sensor in the three axes to the HDC/MPU 23. In this case, the HDC/MPU 23 determines a fall. The HDC/MPU 23 compares the detected gravities of detection result data with thresholds, and determines that a fall is occurring (fall detection) if the gravity is less than the threshold. If such a fall sensor is employed, the HDC/MPU 23 frequently performs fall determinations, for example, and if it has detected a fall (determined that a fall is occurring), it sets a fall detection flag. The fall detection flag is the detection result data described above. The HDC/MPU 23 checks for a fall referring to the fall detection flag on the occasion of a seek start.

Alternatively, the HDC/MPU 23 may check for a fall by comparing the gravity detected by the fall sensor with the threshold on the occasion of the fall check described above. In this example, the fall sensor's outputs or the gravities are the detection result data. The fall sensor frequently updates the detected gravities stored in the register. The HDC/MPU 23 compares the detected data with the threshold on the predetermined occasion to determine the fall (which corresponds to the fall check), and further, issues fake errors with a specific occasion, and compares the detection result data with the threshold in the error recovery process.

In this example, the HDC/MPU 23 issues fake errors on every predetermined occasion in processing and checks for a fall. On the contrary, in the above other example, the HDC/MPU 23 issues a fake error if the fall has been detected. To avoid useless operation, the fake error may be issued if the fall has been detected. Depending on designs, however, the configuration that issues a fake error on every specific occasion and conducts a fall check may be adopted like the present example.

As set forth above, the present invention has been described by way of particular embodiments, but it is not limited to only the above-described embodiments and can of course be modified variously so as not to depart from the scope of the present invention. For example, embodiments of the present invention can be applied to a disk drive device using a different type of disk from a magnetic disk, as well as an HDD. Embodiments of the present invention can be applied to an HDD which performs either read process or write process only.

Embodiments of the present invention can be applied to an HDD having a stand-by position at a different position from the ramp, like an HDD employing the contact start and stop. An actuator may be the moving mechanism of a head slider, but other type of moving mechanisms may be used that move the head slider by different movement.

What is claimed is:

1. A disk drive device comprising:
a disk;
a head configured to access the disk;
a moving mechanism configured to support the head and to move the head along the radial direction of the disk;
a sensor configured to detect a fall; and
a controller configured to control the moving mechanism according to outputs of the sensor, wherein
the controller is configured to check whether or not detection result data of the fall sensor indicates a fall on a predetermined occasion in command processing, and if a fall is recognized, the controller is configured to unload the head by controlling the moving mechanism; to issue a fake error, comprising a pseudo error notice having a same format as a real error notice, on an occasion in the command processing; to start an error recovery process for the fake error; and to conduct the check on the predetermined occasion in the error recovery process, and, if a fall is recognized, the controller is configured to unload the head by controlling the moving mechanism.

2. The disk drive device according to claim 1, wherein the-predetermined occasion is an occasion of a seek start of the head.

3. The disk drive device according to claim 2, wherein the error recovery process includes a re-seek; and the controller checks whether or not detection result data of the fall sensor indicates a fall on the occasion of the re-seek start, and if a fall is recognized, the controller unloads the head by controlling the moving mechanism.

4. The disk drive device according to claim 3, wherein the controller performs the error recovery process according to an error recovery table; and the re-seek is designated to be performed first in the error recovery table.

5. The disk drive device according to claim 1, wherein the controller issues fake errors of the same error on every occasion.

6. The disk drive device according to claim 1, wherein the controller issues the fake error on the occasion of a seek completion of the head.

7. The disk drive device according to claim 1, wherein the fake error is a fake error of a seek error.

8. The disk drive device according to claim 1, wherein if a fall has been detected, the controller issues the fake error on the occasion in the command processing.

9. The disk drive device according to claim 1, wherein the detection result data are data indicating that the sensor for detecting a fall has detected a fall.

10. A control method of unloading corresponding to a fall detection in a disk drive device, comprising:

checking whether or not detection result data of a fall sensor indicates a fall on a predetermined occasion in command processing, and if a fall is recognized, unloading a head;

issuing a fake error, comprising a pseudo error notice having a same format as a real error notice, on an occasion in the command processing;

starting an error recovery process for the fake error; and conducting the checking on the predetermined occasion in the error recovery process, and if a fall is recognized, unloading the head.

11. The method according to claim 10, wherein the predetermined occasion is an occasion of seek start of the head.

12. The method according to claim 11, wherein the error recovery process includes a re-seek step; and the method further comprises:

checking whether or not detection result data of the fall sensor indicate a fall on the occasion of the re-seek start, and if a fall is recognized, unloading the head by controlling a moving mechanism.

13. The method according to claim 12, wherein the error recovery process is performed according to an error recovery table; and the step of the re-seek is the step to be performed first in the steps registered in the error recovery table.

14. The method according to claim 10, wherein fake errors of the same error are issued on every occasion.

15. The method according to claim 10, wherein the fake error is issued on the occasion of a seek completion of the head.

16. The method according to claim 10, wherein the fake error is a fake error of a seek error.

17. The method according to claim 10, wherein if a fall has been detected, the fake error is issued on the occasion in the command processing.

18. The method according to claim 10, wherein the detection result data are data indicating that the sensor for detecting a fall, has detected a fall.

* * * * *